(No Model.)
E. ATKINSON.
COOKING APPARATUS.
No. 424,949. Patented Apr. 8, 1890.
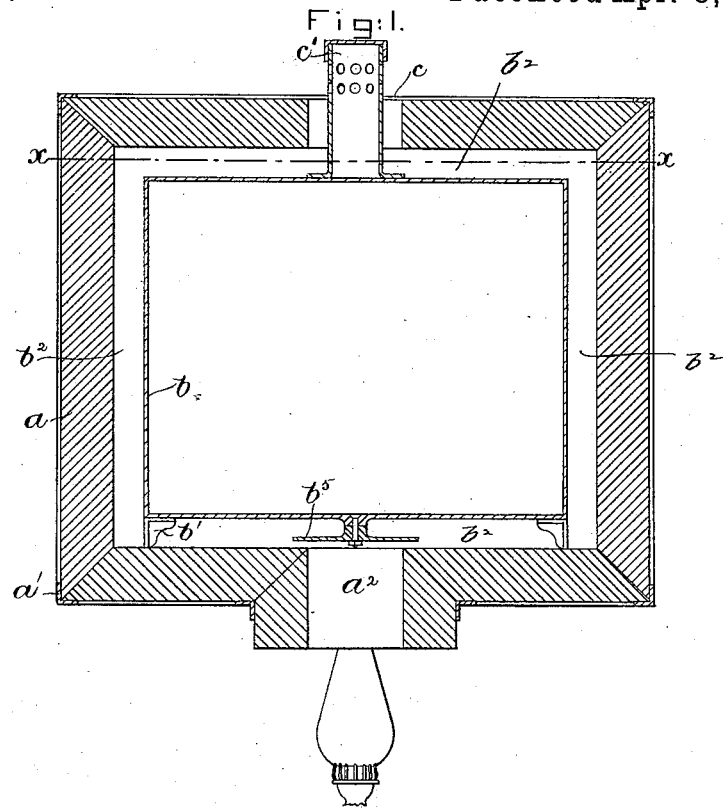
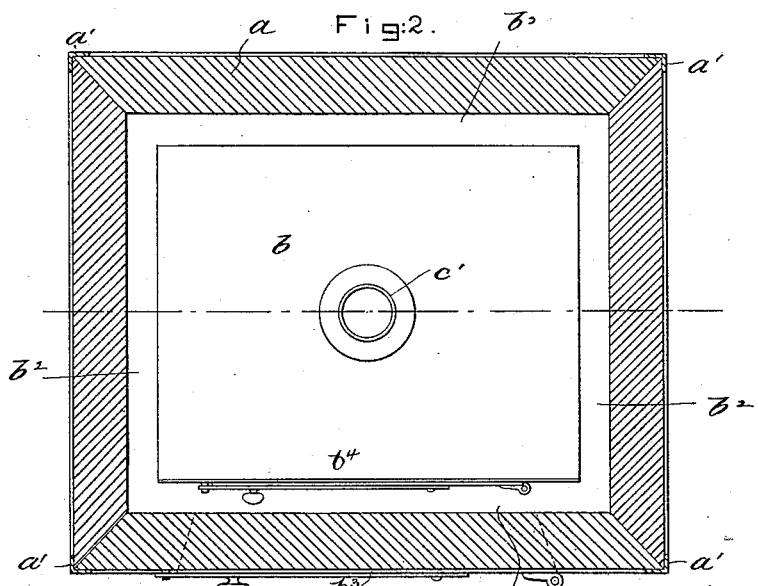
Witnesses:
Fred. S. Greenleaf
John F. C. Prinkloh
Inventor:
Edward Atkinson
by Crosby Gregory
Attys.

UNITED STATES PATENT OFFICE.

EDWARD ATKINSON, OF BROOKLINE, MASSACHUSETTS.

COOKING APPARATUS.

SPECIFICATION forming part of Letters Patent No. 424,949, dated April 8, 1890.

Application filed September 18, 1888. Serial No. 285,687. (No model.)

*To all whom it may concern:*

Be it known that I, EDWARD ATKINSON, of Brookline, county of Norfolk, State of Massachusetts, have invented an Improvement in Cooking Apparatus, of which the following description, in connection with the accompanying drawings, is a specification, like letters on the drawings representing like parts.

This invention has for its object to provide a novel apparatus in which food may be cooked in the most wholesome and nutritious manner at a minimum expense.

In order that food may be cooked in the most wholesome and nutritious way it is necessary that the heat required in the process of cooking should be under ready control and should be so applied that it may be maintained uniformly, not so hot as to burn the food, not so hot as to vaporize the more volatile portions of the fats or juices of meats, yet hot enough to thoroughly cook the food.

In practice I find that bread and meat may be most thoroughly and nutritiously cooked at degrees of heat ranging from 180° to 300° Fahrenheit, a longer time at a comparatively low temperature more than compensating for the intensity of heat which is customarily applied in what is called a "quick oven." It is also desirable when the heat is solely employed for cooking the food rather than for heating the room in which the oven is placed that the said heat should be concentrated upon the vessels containing the food with the least possible waste and in the most uniform manner at the top, bottom, and sides of the said vessel, radiation from the fuel when being applied to cooking or from the outside of the oven in which the vessels containing the food to be cooked are placed working a waste of heat so far as its application to the cooking is concerned.

In order that the heat may be concentrated upon the vessels containing the food, and also that there may be no communication between the heat-generator and the oven in which the food is placed, lest the products of combustion should injure the food, my improved cooking apparatus is composed of an inner oven, in which the food is placed, and an outer oven, within which the inner oven is located, the said ovens being constructed as will be hereinafter specifically described.

My invention consists in a cooking apparatus composed of an outer oven constructed of a substance or material that is essentially a non-conductor of heat to prevent loss of heat by radiation, and capable of withstanding heat, and having an inlet and an outlet for heat, combined with an inner oven arranged within the outer oven and separated therefrom on all sides by a clear space, so as to be completely enveloped in a heated atmosphere, all as I will proceed now more particularly to set forth and finally claim.

Figure 1 is a vertical section of a cooking apparatus embodying my invention, the base of the lamp or heat-generator being omitted to save space in the drawings; and Fig. 2, a horizontal section of the oven shown in Fig. 1 on line $x\,x$.

The outer oven or casing $a$ is made of non-metallic material sufficiently non-heat-conducting to prevent the escape of heat from within through its walls and sufficiently incombustible to resist the degree of heat necessary for cooking.

The walls of the outer oven $a$ may be made of wood pulp or other pulp alone, preferably indurated fiber, or combined with a non-combustible substance, such as asbestus, carbonate of magnesia, &c.; or, if desired, the said walls may be made of slabs of wood treated with a solution of zinc or in any other manner to prevent combustion at the degree of heat required for cooking.

The use of metal for the outer oven is carefully avoided, especially on the outer side, except when the walls are made of slabs, in which case the said slabs may be bound or securely fastened together at their corners by metal strips $a'$.

The bottom of the outer oven is provided with a hole $a^2$, through which is conveyed the heat from a lamp, gas-burner, or other generator.

The outer oven contains within it the inner oven $b$, which may and preferably will be of sheet metal, the said inner oven being of such size and being supported upon suitable legs $b'$ to leave a space $b^2$ for the circulation of heat around it, the said space surrounding the said inner oven on all sides, so that the said inner oven may be completely enveloped in a heated atmosphere, as clearly shown in Figs. 1 and 2.

The outer and inner ovens will be provided with suitable doors $b^3$ $b^4$.

To prevent injury or burning out of the bottom of the inner oven, and also to deflect or diffuse the heat entering through the hole $a^2$, a slab $b^5$, preferably of soapstone, is interposed between the inner and outer ovens above the hole, the said slab protecting the bottom of the inner oven and preventing food immediately over the hole from being burned or scorched.

The top of the outer oven is provided with a hole or opening $c$ for the escape of the waste heat, the inner oven being preferably provided with a chimney or ventilator $c'$, extended up through the said opening.

In order to avoid waste of heat, the outer surface of the outer oven is made non-metallic, whereby outward radiation is prevented. In this manner I am enabled to perform a large amount of cooking with a minimum expenditure of heat.

I claim—

1. In a cooking apparatus, an outer oven constructed of a substance or material that is essentially a non-conductor of heat, and so as to prevent loss of heat by radiation, and capable of withstanding heat, and having an inlet and an outlet for heat, combined with an inner oven arranged within the outer oven and separated therefrom on all sides by a clear space for the passage of heat and the products of combustion, if any, substantially as described.

2. In a cooking apparatus, an outer oven constructed of indurated fiber capable of withstanding heat and resisting loss of heat by radiation, and having an inlet and an outlet for heat, combined with a metallic oven arranged within the outer oven and enough smaller than it to afford a space wholly surrounding the inner oven and constituting a heating-chamber, substantially as described.

In testimony whereof I have signed my name to this specification in the presence of two subscribing witnesses.

EDWARD ATKINSON.

Witnesses:
JAS. H. CHURCHILL,
HOWARD F. EATON.